United States Patent [19]

Greenslade

[11] Patent Number: 5,012,592
[45] Date of Patent: May 7, 1991

[54] FASTENER DIMENSION MEASURING MACHINE

[76] Inventor: Joe E. Greenslade, P.O. Box 330865, Fort Worth, Tex. 76163

[21] Appl. No.: 544,311

[22] Filed: Jun. 27, 1990

Related U.S. Application Data

[63] Continuation-in-part of Ser. No. 313,909, Feb. 23, 1989, abandoned.

[51] Int. Cl.⁵ .................. G01B 3/22; G01B 5/02; G01B 5/08
[52] U.S. Cl. .................................... 33/833; 33/569; 33/549
[58] Field of Search .............. 33/568, 569, 549, 832, 33/833, 548

[56] References Cited

U.S. PATENT DOCUMENTS

| | | | |
|---|---|---|---|
| 1,007,185 | 10/1911 | Craley | 33/568 |
| 2,811,781 | 11/1957 | Johnson et al. | 33/569 |
| 3,239,939 | 3/1966 | Aller | 33/549 |
| 3,823,482 | 7/1974 | Schiler | 33/549 |
| 3,895,356 | 7/1977 | Kraus | 33/832 |
| 3,939,569 | 2/1976 | Squires | 33/832 |
| 4,106,240 | 8/1978 | DeBartolo | 33/832 |
| 4,565,094 | 1/1986 | Sedgewick | 33/568 |
| 4,598,480 | 7/1986 | Cukelt | 33/833 |
| 4,679,326 | 7/1987 | Takizawa et al. | 33/832 |
| 4,805,310 | 2/1989 | Fernand | 33/832 |
| 4,825,557 | 5/1989 | Nettleton et al. | 33/549 |

FOREIGN PATENT DOCUMENTS

| | | | |
|---|---|---|---|
| 66194 | 1/1948 | Fed. Rep. of Germany | 33/569 |
| 1912605 | 10/1970 | Fed. Rep. of Germany | 33/832 |
| 58-47202 | 3/1983 | Japan | 33/832 |
| 60-107509 | 6/1985 | Japan | 33/832 |

OTHER PUBLICATIONS

"Dimension-All, Fastener Gage," Fastener Inspection Products, Fort Worth, Texas.

*Primary Examiner*—William A. Cuchlinski, Jr.
*Assistant Examiner*—Diego F. F. Gutierrez
*Attorney, Agent, or Firm*—Henry W. Cummings

[57] ABSTRACT

A fastener dimension measuring machine is disclosed including a rotatable plate containing a series of openings in the plate of different sizes and diameters to allow insertion of a wide variety of different size and shaped fasteners. Flat head protrusion, outside diameters, head heights, lengths and tolerance compliance may be measured in the machine. A measuring member is located above the plate, and is movable vertically between a fastener measuring and a fastener insertion or removal position. The measuring member is manually movable laterally relative to the plate to the measuring position, and is electrically connected to a digital recording member, which records and displays the measurements made. A foot pedal is provided to activate recording of the data, which then may be printed out in a desired manner.

13 Claims, 5 Drawing Sheets

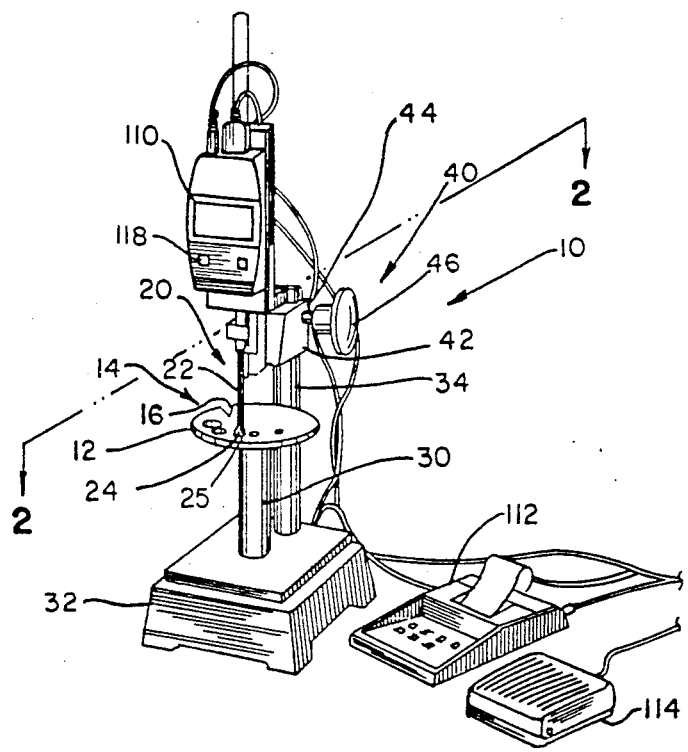
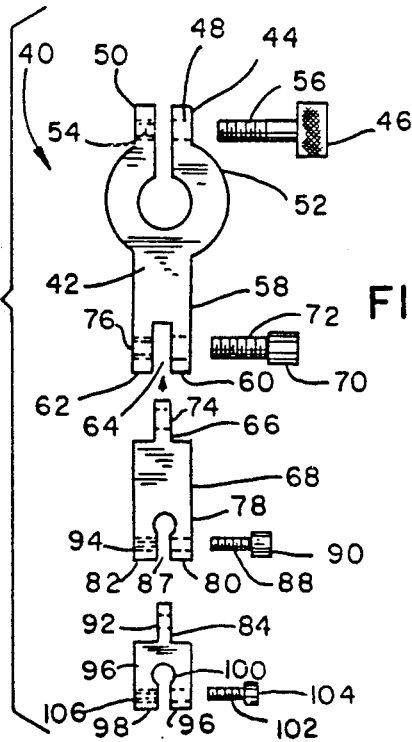
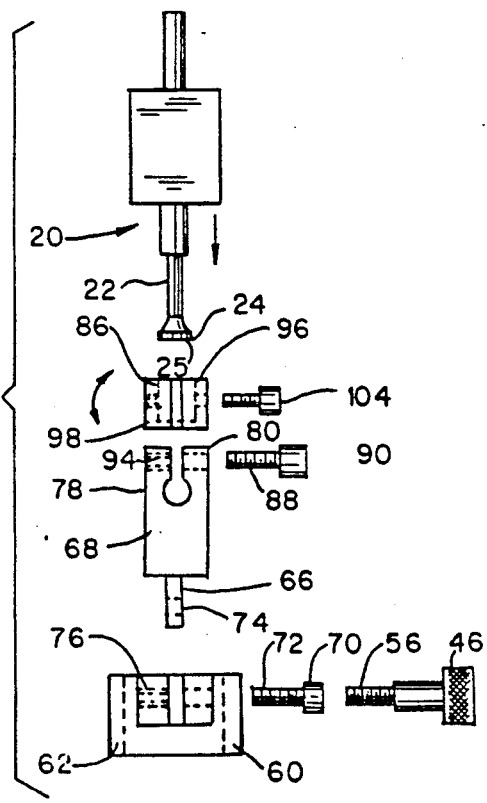
FIG. 1.
FIG. 2.
FIG. 3.

1

FASTENER DIMENSION MEASURING MACHINE

REFERENCE TO RELATED APPLICATION

This application is a continuation in part of application Ser. No. 07/313,909, filed Feb. 23, 1989 now abandoned.

BACKGROUND OF THE INVENTION

Previous fastener dimension measuring machines have not had the ability to quickly and accurately measure fastener dimensions.

Another important objective is the ability to record selected data, and print out the data quickly.

Another object of the invention is to be able to quickly provide adjustment of the dimension measuring member.

Other objects will be apparent from the following description and drawings.

SUMMARY OF THE INVENTION

A fastener dimension measuring machine is disclosed including a rotatable plate containing a series of openings in the plate of different sizes and diameters to allow insertion of a wide variety of different size and shaped fasteners. Flat head protrusion, outside diameters, head heights, lengths and tolerance compliance may be measured in the machine. A measuring member is located above the plate, and is movable vertically between a fastener measuring and a fastener insertion or removal position. The measuring member is manually movable laterally relative to the plate to the measuring position, and is electrically connected to a digital recording member, which records and displays the measurements made. A foot pedal is provided to activate recording of the data, which then may be printed out in a desired manner.

BRIEF DESCRIPTION OF THE DRAWINGS

FIG. 1 is a schematic perspective view of the Fastener Dimension Measuring Machine of the present invention.

FIG. 2 is an exploded plan view of the measuring member adjustment assembly looking in the direction of the arrows in FIG. 1.

FIG. 3 is an exploded front view of the adjustment assembly illustrated in FIG. 2.

DESCRIPTION OF PREFERRED EMBODIMENTS

Figure 7:
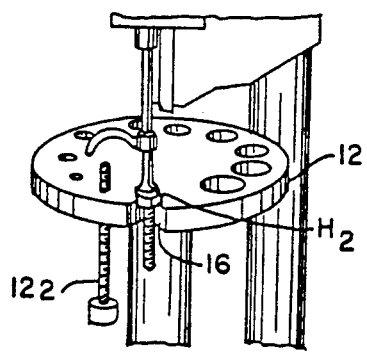
FIG. 7 is a schematic perspective view of the fastener dimension measuring machine of the invention including a slot in the rotatable plate to measure fastener heads.
Figure 10:
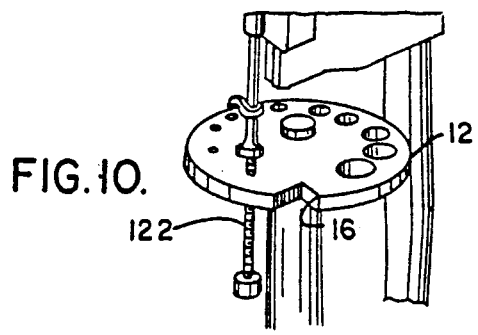
FIG. 10 is a schematic perspective view illustrating the adjustment screw used to set the product measurement limits in the digital controller.

In the drawings, the fastener dimension measuring machine is indicated at 10. This machine includes a rotatable plate 12 containing a series of openings 14 extending through the thickness of the plate, of varying diameters, to receive fasteners to have their dimensions measured. The plate 12 is sufficiently thick to allow measurements of the heads of fasteners whose shanks extend through the plate. A diameter of 4 to 6 inches and a thickness of 0.20 to 0.40 inches is convenient. As shown in FIG. 7 plate 12 also includes a slot 16 in its external surface to receive fasteners for measuring dimensions.

A measuring member 20 is located above the plate which is vertically movable between a measuring position engaging the surface of a fastener to be measured, and a placement position above the plate when fasteners are inserted or removed from the plate. The measuring member includes a shank portion 22, and a measuring foot 24. The foot is of preferably of greater cross sectional area than the shank portion, and includes a flat lower measuring surface 25.

Plate 12 is rotatable about, and is supported by a pedestal 30, which, in turn rests upon a base 32. Base 32 also supports a vertical support shaft 34 upon which is mounted a measuring member adjusting assembly 40 shown in FIGS. 2 and 3.

Adjusting assembly 40 includes an indicator support 42 having an adjustment portion 44 which engages support shaft 34, and whose location on the shaft 34 is controlled by knob 46. Upon loosening knob 46, indicator support arm 42 may raised or lowered with respect to support shaft 34, or may be rotated to a different angular position upon shaft 34.

Figure 4:
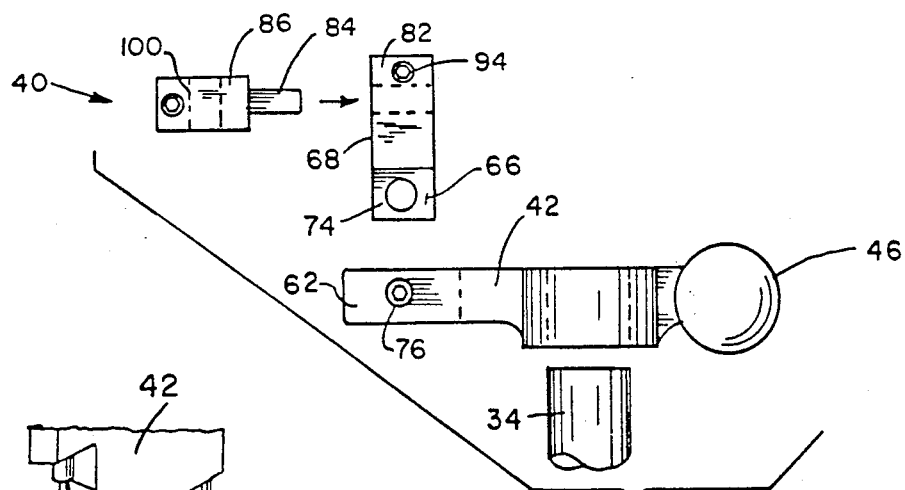
FIG. 4 is an exploded side elevation view of the adjustment assembly illustrated in FIG. 2.

The details of the support assembly 40 are shown in FIGS. 2-4. As shown in FIG. 2, the support arm 42 includes a bifurcated adjustment portion 44 having legs 48 and 50. Leg 48 includes an opening 52, and leg 50 includes a threaded opening 54 which receives threaded shank 56 of adjusting knob 46. Thus arm 42 may be adjusted vertically and radially upon shaft 34 by loosening and then tightening knob 46.

The distal end 58 of arm 42 is bifurcated and includes legs 60 and 62. A slot 64 between leg s 60 and 62 receives an extension 66 of middle knuckle 68. Extension 66 may be located at a desired angularity within slot 64, and is held in place by tightening control screw 70, with threaded shank 72 extending through opening 74 in extension 66, and engaging threaded opening 76 to provide vertical and lateral adjustability.

Middle Knuckle 68 is also bifurcated at its distal end and includes two legs 80 and 82. An extension 84 of front knuckle 86 extends into opening 87 and is adjustable therein by shank 88 of adjusting screw 90 extending through opening 92 of extension 84 into threaded opening 94 in leg 82, to provide horizontal adjustability.

Front knuckle 86 is also bifurcated at its distal end and includes legs 96 and 98, and opening 100. Opening 100 receives connection portion 26 of measuring member 20. Connection portion 26 is held in place within front knuckle 86 by the shank 102 of adjusting screw 104 extending into threaded opening 106 in leg 98.

The digital process controller 112 is a commercially available data processing unit. For example a MITUTOYO DIGIMATIC MINI-PROCESSOR, Model No. DP-1DX 264-501 may be used for processing the dimensional data obtained in accordance with the present invention. The OPERATING MANUAL for this unit is hereby incorporated into the present application by this reference. A copy is found in the file of this application.

As described in greater detail in this OPERATING MANUAL, this processor includes a rear panel 122 including a jack 123 to receive electrical signals for the foot switch or pedal 114. A mode switch is also provided on digital process controller 112. Connection jacks 125 to receive electrical signals from the measuring unit 20 and the indicator 110, and an alternating current adaptor 127 are also provided.

A control panel 129 is provided to control operation of processing the dimension data. This control panel includes a clear key 132 to clear all the data in memory; a cancel key 134 to cancel a data entered immediately before pressing this key; a tolerance limit key 126 to be pressed before and after entering tolerance limit values; a statistical key 130, to begin processing statistical calculations and plotting data; a feed key 136 to feed recording paper; and ad data key 128 to enter measurements or limits displayed on the indicator 110 into the digital processor 112. Detailed operating instructions are contained in the OPERATING MANUAL found in the application file, and will not be repeated here.

Figure 11:
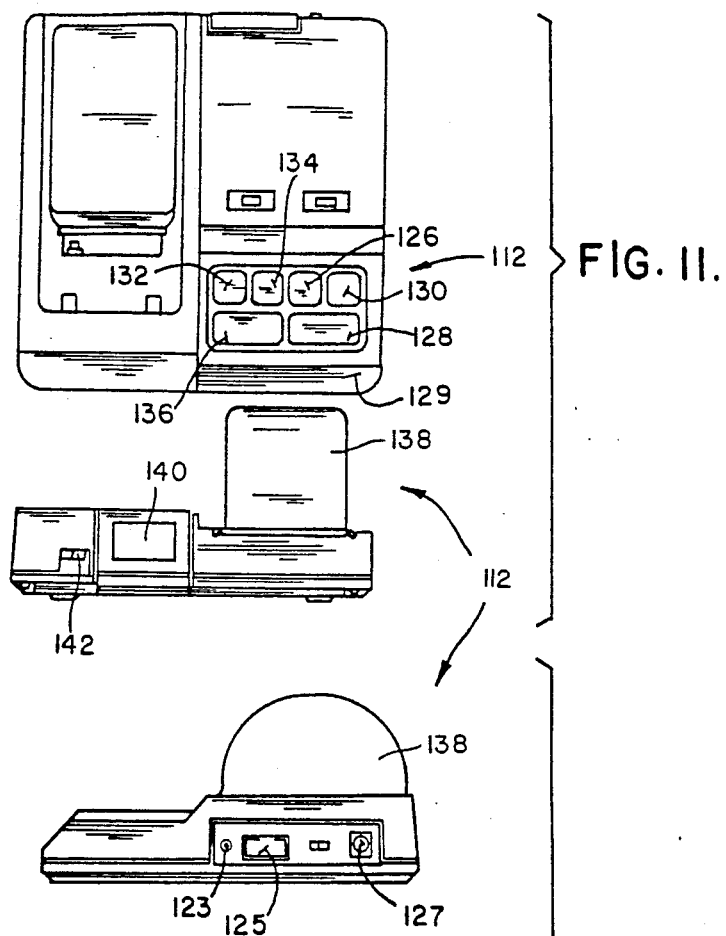
FIG. 11 is a schematic plan view of the digital process controller used in the present invention.
Figure 12:
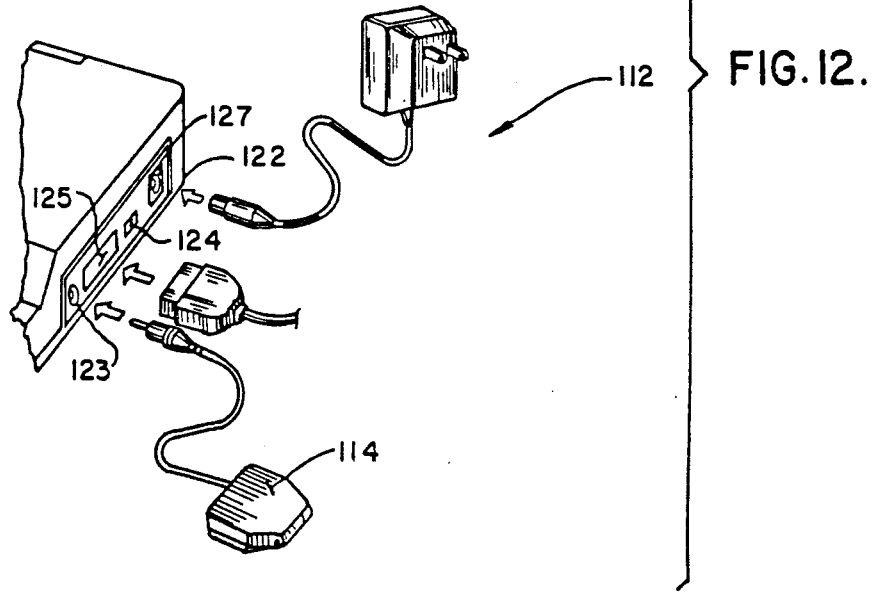
FIG. 12 is a schematic perspective view of a portion of the digital process controller used in the present invention.

The processor 112 does include, as shown in FIG. 11, a recording paper cover 138, a battery box 140 in case A.C. current is not used, and a power on and off switch 142.

It therefore is apparent that measuring member (20) may be located in any appropriate position above plate (12) to effect measurements of a fastener.

The fastener dimensions being measured are readable on an electronic digital indicator providing by Mitutoyo of Japan Model #543-425. This may be obtained, for example, from Fastener Inspection Products in Rockford, Ill. and indicated at 110 in the drawing.

Fastener data may be recorded and processed through a purchased data processor, for example, from Mitutoyo of Japan, Model #264-501 indicated at 112 in the drawings.

To activate recording of the data, a foot switch 114 is provided which is an electrical contact with the indicator 110. The foot switch is also obtainable from Mitutoyo of Japan for example Model #937-179 which can also be obtained from Fastener Inspection Products in Rockford, Ill.

Figure 5A:
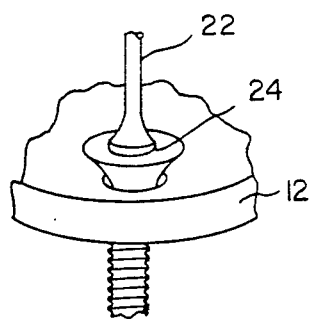
FIG. 5a is an enlarged perspective view of a portion of FIG. 5.
Figure 5:
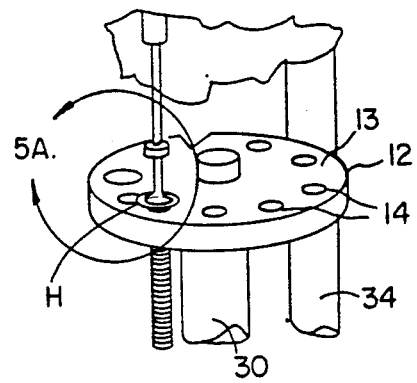
FIG. 5 is a schematic perspective view of measuring flat head fasteners in accordance with the present invention.

In use of the present invention to measure the protrusions on flathead fasteners as shown in FIGS. 5 and 5A, the indicator foot lower surface (25) is placed on the upper surface (13) of the plate (12). The zero button (118) of the apparatus is then pressed. The flathead fastener is then placed in the correct hole size marked on the plate (12) in which the fastener head is larger than the diameter of the opening. The measuring member is moved until the foot rests on the top of the head H to be measured. The measurement is displayed at 110.

The data may be recorded with foot switch or pedal 114. Protrusion gaging of counter sunk heads can also be measured according to attached ANSI B18.6.2-6.4 Standard and values of F and F' Calculated, as Shown in FIG. 5A.

Figure 6:
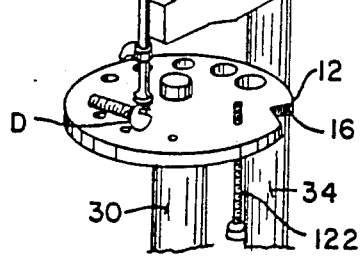
FIG. 6 is a schematic perspective view of measuring diameters of fasteners in accordance with the present invention.

As shown in the FIG. 6, to measure the outside diameters and other measurements, fill the lower surface of the indicator foot 25 is placed on the upper surface 13 of the plate 12 in a blank area and the zero button 118 is pressed. Then the indicator foot 24 is lifted and the fastener or other dimension desired to be measured is placed under the indicator foot. The lower surface 25 of the indicator foot is then located on the surface of the fastener or other member to be measured and the diameter D, or other results read from the indicator (110). If it is desired to record the data at the time of the measurement, the foot pedal (114) is pressed.

As shown in FIG. 7, to measure the head height of fasteners, first the knob (46) is loosened on the indicator support arm 34 and the arms are rotated to either side so that the indicator foot (24) is over the edge of the plate (12). The rod (46) is then retightened. Zero button (118) is pressed. The plate is then rotated so that the slot 16 in the outer surface of the plate is under the indicator foot (24). Then the foot (24) is lifted and parts placed into the slot (16) to measure the height. If it is desired to record data, foot switch (114) is pressed.

Figure 9:
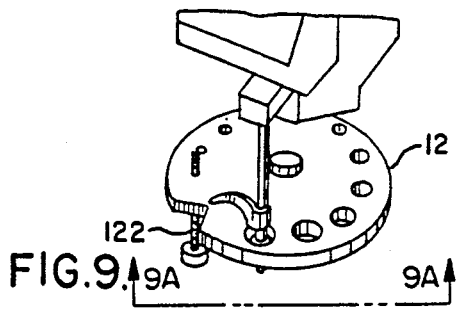
FIG. 9 is a schematic perspective view of another step in measuring the length of fasteners in accordance with the invention.
Figure 8:
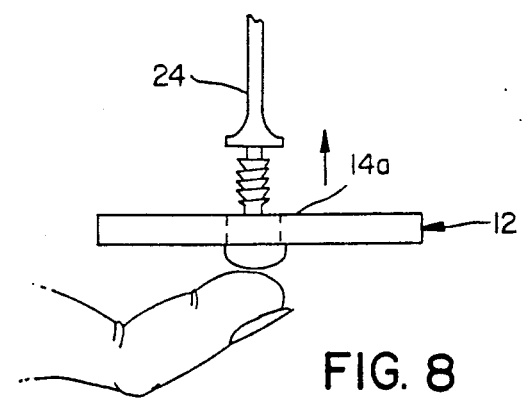
FIG. 8 is a side elevation view of measuring lengths of fasteners in accordance with the present invention.
Figure 9A:
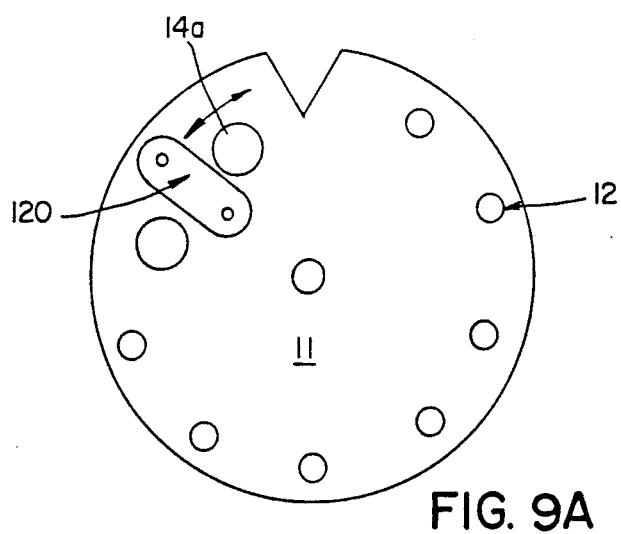
FIG. 9a is a bottom view looking in the direction of the arrows along the line 9a in FIG. 9.

In FIGS. 8, 9, and 9A, for measurement of lengths from ¼" to 2", first the stop (120) is set under the hole 14a marked ⅜" in the plate (12) in such a manner that the stop is across the bottom of the hole as shown in FIG. 9A, and firmly against the bottom 11 of the plate. Next the plate is rotated until the indicator foot drops into the ⅜" hole 14a and rests firmly against the stop. Then zero button (118) is pressed, and the foot (24) Is lifted and the plate (12) is rotated so that the foot (24) is above a hole slightly larger than the major diameter of the part. Then, as shown in FIG. 8, the part to be measured is inserted from the lower surface 11 of the plate (12), pressing the underside of the head firmly against the bottom of the plate (12) to measure the parts length. If it is desired to record the data, press the foot switch or pedal (114).

It is possible to change the characteristics tolerances in the process. In order to do this, first the indicator is zeroed as described above for the characteristic of the fastener desired to be measured. Next, the plate 12 is moved so that the indicator foot (24) is located over the adjustment screw (122) which extends through the plate. Next the processor switch (124) is set to mode (2). Then the button (126) on the processor labeled "tolerance limit" is pressed. Then the adjusting screw 122 is moved up or down till the indicator reads the lower limit of the tolerance of the part you will inspect and press "data" at switch (128). Next move the adjustment screw 122 up until the indicator reads to the upper limit of the tolerance of the part you will inspect and press data button (128) again. Next, tolerance limit is again pressed. Then move the plate(12) so that it positioned to measure the desired characteristic correctly. Then, measure the parts, pressing the foot switch (114) when the part is in proper position. After measuring all samples press stat button (130). To remove the tolerance limits you set into the processor, press tolerance limits 126. Then press clear button (132).

I claim:

1. Apparatus for measuring dimensions comprising means for supporting a rotatable plate containing a plurality of different size opening to measure different size dimensions; means for supporting a dimension measuring member above said plate, wherein said plate is movable between a dimension measuring position and a fastener placement position; display means adjacent said measuring member for indicating the dimension measurements made; and recording means for recording the dimension measurements made.

2. Apparatus for measuring dimensions according to claim 1 wherein said means for supporting the measuring member include means for adjusting the location of said measuring member, both vertically and laterally.

3. Apparatus for measuring dimension according to claim 2 wherein means for adjusting the location include at least two separate means for adjusting the vertical position of the measuring member.

4. Apparatus for measuring dimensions according to claim 3 wherein the means for adjusting the location of the measuring member includes at least two separate means for adjusting the lateral position of the measuring member.

5. Apparatus for measuring dimensions according to claim 3 wherein the means for indicating the dimension measurements comprises a digital readout instrument.

6. Apparatus for measuring dimensions according to claim 5 wherein the means for recording the measurements made comprises a digital process controller.

7. Apparauts for measuring dimensions comprising:
means for supporting a rotatable plate containing a series of opening of different size to measure different dimensions;
means for supporting a dimension measuring member above said plate which is movable between a dimension measuring position and a fastener placement position; in said dimension measuring position, said dimension measuring member being adjustable in at least two positions laterally and in at least two positions vertically; display means adjacent said measuring member for adjusting said measuring member for indicating the dimension measurements made; and recording means for recording the dimension measurements made.

8. Apparatus for measuring dimensions according to claim 7 comprising a generally vertical support shaft, and wherein the means for support shaft, and wherein the means for supporting said dimension measuring member comprise a bifurcated arm and means for releasing holding said arm in engagement with said shaft.

9. Apparatus according to claim 8 wherein said arm is also bifurcated at its distal end and said distal end receives means for adjusting said measuring member within a vertical plane.

10. Apparatus according to claim 9 wherein said means for adjusting said measuring member in a vertical plane comprises a first knuckle having a first bifurcated knuckle distal end which receives a second knuckle which is adjustable within said first bifurcated distal end.

11. Apparatus according to claim 10 wherein said plate includes a slot in its outer periphery to receive items to be measured.

12. Apparatus according to claim 11 wherein the means for recording the dimensions measured includes a foot pedal which is activated by the operator's foot to record desired data.

13. Apparatus according to claim 12 wherein the foot pedal rests upon the floor.

* * * * *